May 30, 1950

C. S. SORENSEN 2,509,256

VARIABLE DISPLACEMENT PISTON PUMP AND CONTROL SYSTEM FOR
THE SAME TO CONTROL THE PUMP IN BOTH A HIGH-PRESSURE
PHASE AND A LOW-PRESSURE PHASE

Filed June 17, 1946

Inventor
Clarence S. Sorensen

By Lyon & Lyon
Attorneys

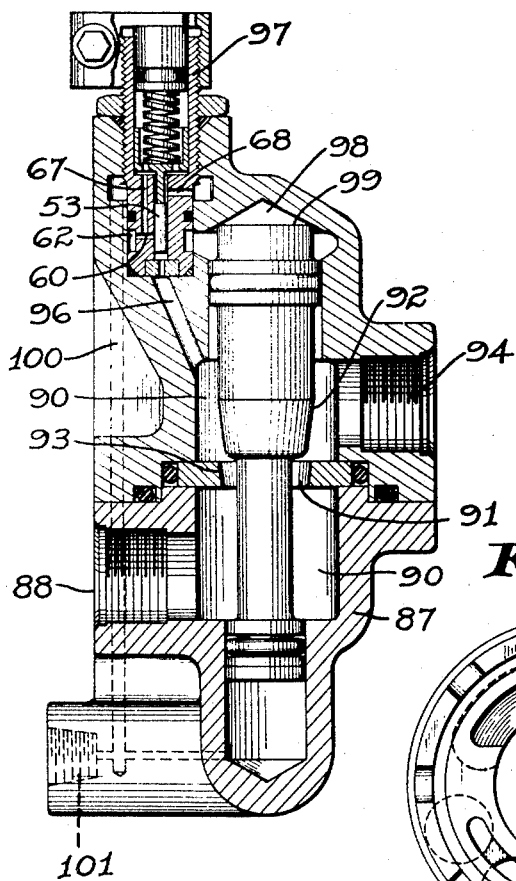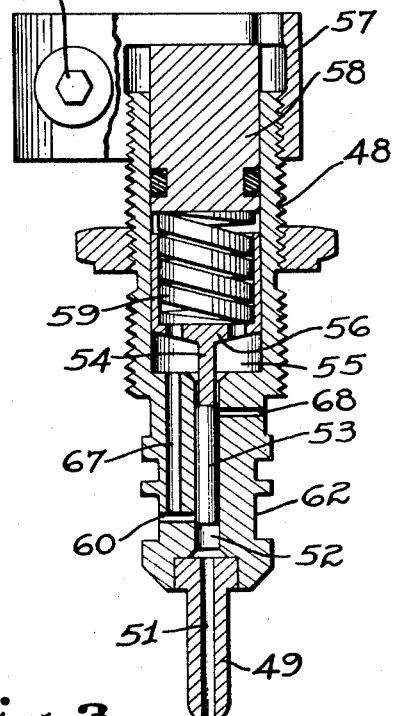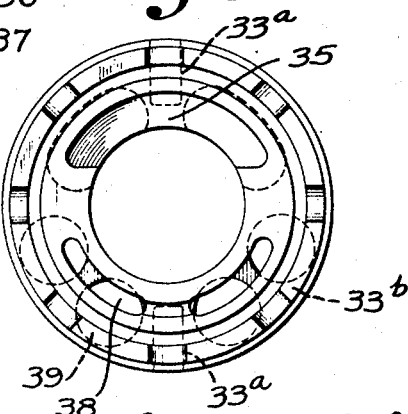

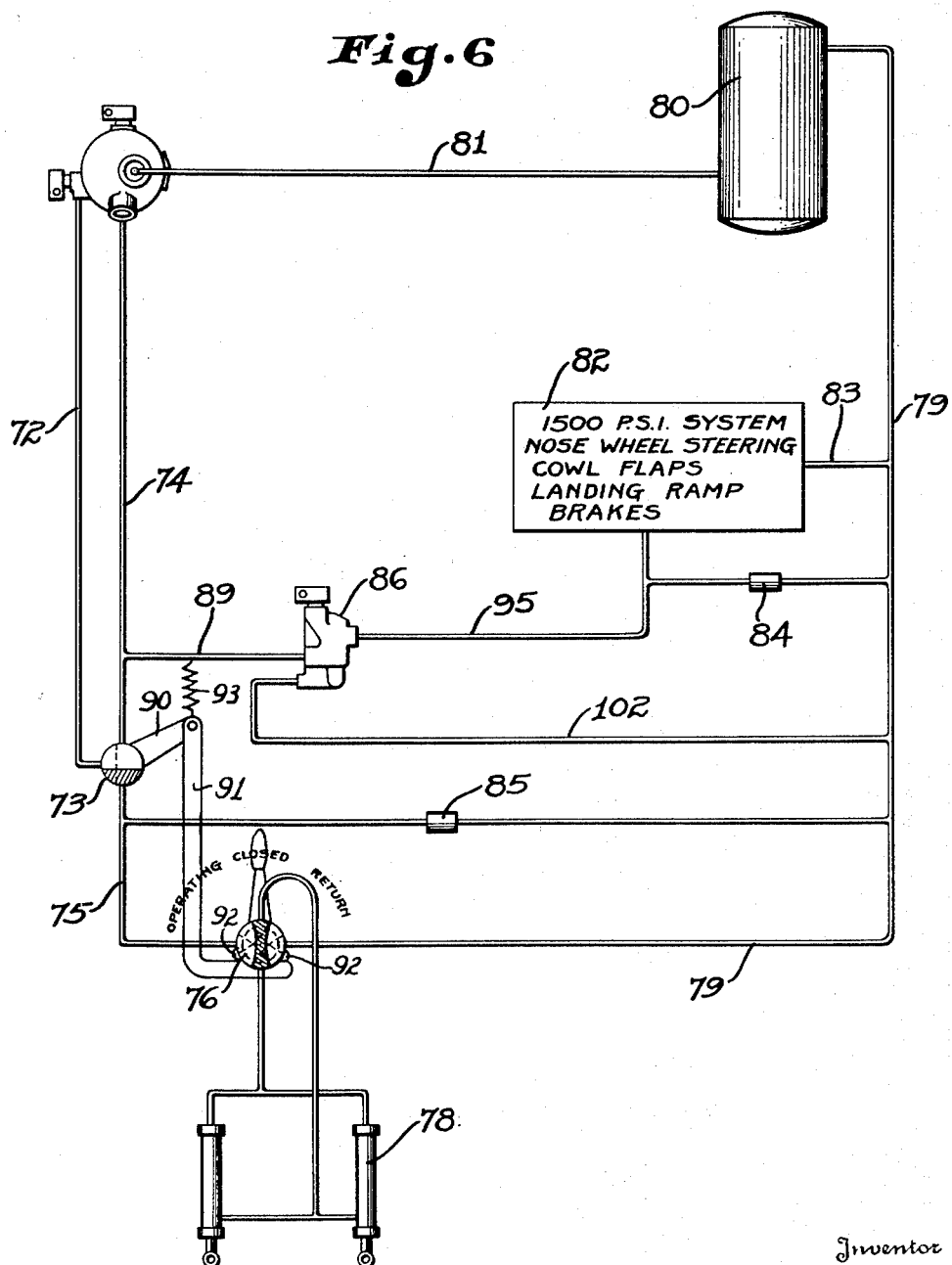

Patented May 30, 1950

2,509,256

UNITED STATES PATENT OFFICE 2,509,256

VARIABLE DISPLACEMENT PISTON PUMP AND CONTROL SYSTEM FOR THE SAME TO CONTROL THE PUMP IN BOTH A HIGH-PRESSURE PHASE AND A LOW-PRESSURE PHASE

Clarence S. Sorensen, Cleveland, Ohio

Application June 17, 1946, Serial No. 677,343

10 Claims. (Cl. 60—97)

My invention relates to a variable displacement piston pump and a control system for same, and more specifically, to a method of controlling the displacement of a variable piston pump, either a single pressure hydraulic system or a dual pressure hydraulic system.

The present invention is specifically adapted for use with the pump described in my copending application, Serial No. 563,335, filed November 14, 1944.

By the use of my invention, a pump as described in the above set forth application can be adjusted to deliver a maximum pressure and a maximum volume until it reaches, for example, a pressure of 2700 lbs. per sq. in., and this volume is then automatically reduced to zero as the pump attains the pressure of 3000 lbs. per sq. in. However, the compensators hereinafter described that cause this action may be adjusted to operate the pump at various pressures and to feather out volume at any desired point. The action is smooth and uniform and will not cause pressure fluctuations.

Another object of my invention is to provide a pressure regulating system especially adapted for use with aircraft. The higher the pressure in the hydraulic system of an aircraft the greater the saving in weight as the higher pressure needs smaller machinery to accomplish the same amount of work. A large percentage of this saving is in reducing the size of the hydraulic cylinders required to operate the main landing gear and wing flaps. The balance of the units, such as nose wheel steering, landing ramps, cowl flaps, brakes, etc., can be operated with 1500 lbs. per sq. in. inasmuch as these do not require much power to operate, and, therefore, their cylinders are usually smaller. Consequently, a dual pressure system which will furnish 3000 lbs. per sq. in. for operating the main landing gear and wing flaps, and 1500 lbs. per sq. in. for the other devices achieves a substantial saving of weight.

By the controls of my invention such a dual pressure system can be automatically secured from the pump described herein.

The controls automatically regulate the volume of fluid delivered according to the requirements or demands of the aircraft system. The pump is automatically changed from low to high pressure operation and vice versa when the landing gear selector valve is operated. Therefore, the high pressure system is only used during the take off and landing. This conserves power. When the high pressure system is in operation the hydraulic pump will feather to zero delivery at 3000 lbs. per sq. in. During operation of the high pressure system, the low pressure system is maintained by a pressure regulator which receives its oil supply from the high pressure system. Dual controls are provided which allow the pump to automatically operate on both the high and low pressure system as a variable volume unit. Operating the pump to its full capacity and pressure, 3000 lbs. per sq. in., only during landing and take off when the main landing gear is operated, and at other times during flight only operating on 1500 lbs. per sq. in. saves the pump mechanically by virtue of the fact that when the system does not require any fluid supply the stroke of the pump pistons is reduced to zero. This enables the pump to maintain the system pressure with a minimum amount of power consumption (approximately 75% saving during flight).

Other objects and advantages of my invention will be apparent from the following description of the preferred embodiments thereof.

In the drawings:

Figure 3 is a plan view of the valve bodies of my pump.

Figure 4 is a cross section of one of the compensators.

Figure 5 is a cross section of the pressure reducing regulator.

Figure 6 is a schematic view showing the dual pressure control system.

Figure 1:
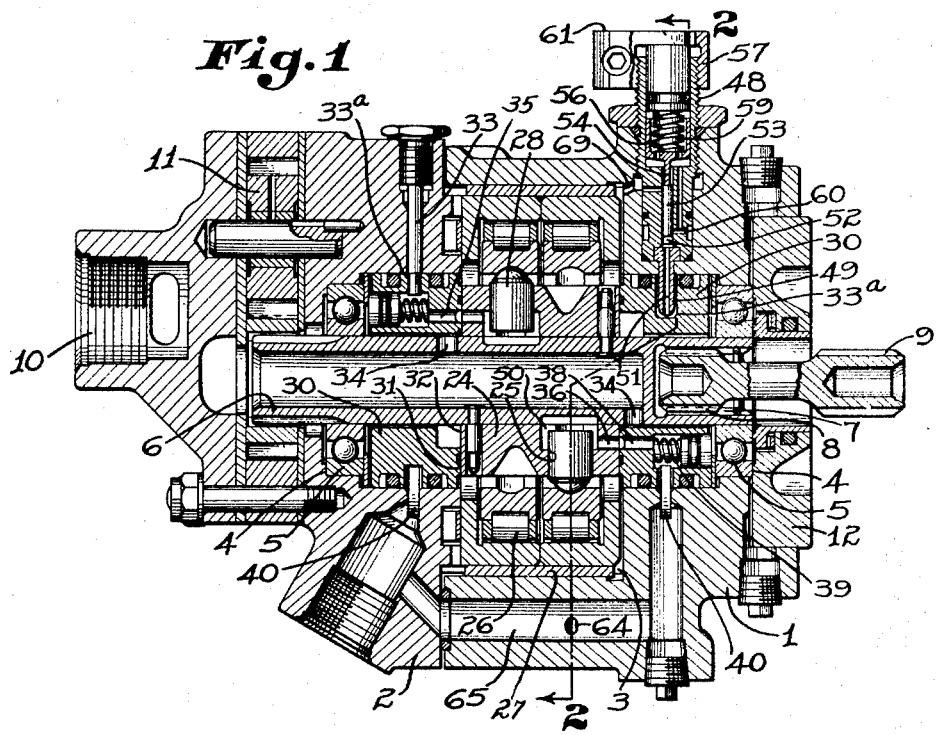
Figure 1 is a cross section of my variable displacement pump.
Figure 2:
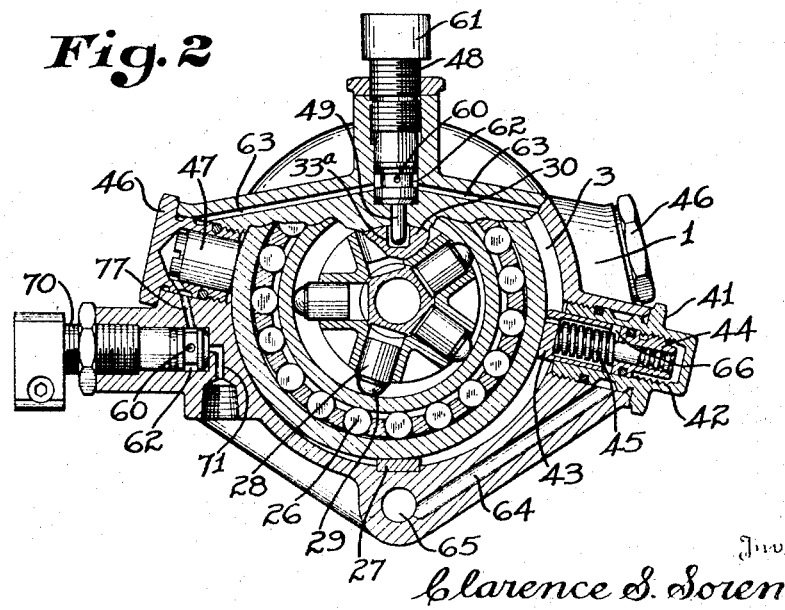
Figure 2 is a partial cross section taken on the line 2—2 of Figure 1.

Referring specifically to Figure 1, a pump constructed in accordance with my invention consists of a housing 1 having a cover 2, a central cavity 3, having at each end of this cavity seats 4 for the reception of ball bearing races 5. The ball bearing races 5 comprise bearing surfaces for the tubular shaft 6 which is journaled thereon and free to rotate.

At one end of the shaft 6 are splined teeth 7 which cooperate with the splined teeth 8 on a stub shaft 9. At the outer end of the stub shaft 9 are carried teeth or other means for connecting to a prime mover to drive said stub shaft 9 and tubular shaft 6.

The main intake to the pump is through the threaded bore 10 in the cover 2 through a gear pump 11 into the center of the tubular shaft 6. A cover plate 12 seals the end of the housing opposite from the cover 2.

The tubular shaft 6 carries a cylinder block 24 which may be an integral part of the tubular shaft 6, or a separate piece which is a force fit on the shaft 6. The cylinder block 24 is bored in a radial form to have a plurality of cylinders 25. In the preferred form of my invention I have an odd number of cylinders such as 5, 7, or 9, and stagger cylinders of one row or bank with relation to the other. The cylinders are arranged in two banks to provide two separate radial series of cylinders. Surrounding the cylinder block 24 are antifriction bearings 26 which are slidably carried by the housing 1. Each of the bearings 26 is free to slide independently of the other and the housing 1 carries the squared off plates 27 so that the bearings can only slide in one direction in the central cavity 3.

Pistons 28 are carried in the cylinders 25 and each piston 28 has at its outer end a ball 29 which engages the inner surface of the bearings 26 and absorbs the motion which is transmitted to the ends of the pistons. This ball may be spun into the end of the piston to maintain it in position, but it must be free to rotate thereon between the piston 28 and the bearings 26. The centrifugal force applied to the piston 28 by rotation of the tubular shaft 6 causes the pistons to be forced against the bearings 26. To secure a positive alignment, less friction and better contact between the ball 29 and the bearings 26, a semicircular groove is formed in the races of bearings 26 in which the balls 29 run. To cause the pistons 28 to reciprocate in the cylinders 25, the bearings 26 are moved into an eccentric position in relation to the main shaft 6. To reduce vibration and to balance the pump, I position the bearings 26 on opposite sides of the shaft 6. This causes one bank of pistons to oppose the action of the other bank.

At each end of the cylinder block 24 is positioned a valve body 30. The valve bodies have surfaces 31 which are ground and lapped to engage the ground and lapped surface 32 on the cylinder block.

In a pump of the preferred type the valve bodies 30 have substantially $\frac{1}{32}$ of an inch of clearance between their inner surfaces and the tubular shaft 6 and are free to slide thereon. Although the valve bodies 30 are free to slide on the shaft 6, they must not rotate thereon and I provide the pins 33 and pin extensions 49 which engage the bores 33ª. The bores 33ª are elongated to permit the valve body to slide longitudinally.

The tubular shaft 6 carries a series of ports 34 around its peripheries which open into the ports 35 in the valve body 30. The cylinder block 24 has ports 36 which open into the cylinder 25. On the opposite side from the port 36 is a relief area 50 to equalize the hydraulic pressure and prevent a tipping of the pistons 28.

Upon rotation of the shaft 6 the hydraulic fluid passes through the ports 34, 35 and 36 into the cylinders 25. When the bearings 26 are eccentrically positioned in relation to the shaft 6 and the shaft 6 rotates, the pistons 28 follow the bearings 26, and in one-half of the rotation the pistons travel outwardly in the cylinders, causing the suction stroke which draws the fluid into the cylinder. Upon the other half of the rotation, the pistons are forced inwardly, causing them to force the hydraulic fluid outwardly through the ports 36 in the cylinder block, into the ports 38 in the valve body 30, into the bore 39 and then outwardly through the discharge 40. The elongated slots 33ª are in communication by means of the groove 33ᵇ with the bore 39 and discharge 40, and are filled with the high pressure fluid.

A feature of my pump is that it is what is known as a variable displacement pump; that is, it maintains a substantially constant pressure and at the same time a variable amount of fluid can be delivered to the hydraulic system.

To automatically control the pressure and volume delivery, I provide a cap 41 which is threaded into the housing 1. This cap 41 has a bore 42 connecting with the central cavity 3. Positioned in this bore 42 is a slidable piston 43. Threaded to the cap 41 is a tension regulator 44 and a spring 45 is positioned between the tension regulator 44 and the piston 43. The pressure of the spring 45 between the regulator 44 and the piston 43 urges the piston 43 against the bearing 26, causing it to take an eccentric position in relation to the tubular shaft 6.

Directly opposite the cap 41 in the body 1 is threaded a cap 46 which contains a piston 47 which engages the opposite side of the bearing 26. Threaded to the housing 1 is a compensator 48. This compensator has an extension 49 which enters the elongated slot 33ª in the valve body 30. The pin extension 49 has a bore 51 extending from the slot 33ª to the cylinder 52. Positioned within the cylinder 52 is a piston 53. The piston 53 has an extension 54 extending outwardly into the large cylinder 55 in the body of the compensator 48. The extension 54 carries at its outer end a piston 56. A cap 57 is threaded to the compensator 48 and maintains a piston adjuster 58 in position. Between the piston adjuster 58 and the piston 56 is positioned a spring 59. When the cap 57 is threaded inwardly on the compensator 48 it places a greater tension upon the spring 59, urging the piston 53 inwardly, closing the connection between the bore 51 and the port 60. Adjustment of the compression on the spring 59 is accomplished by adjusting the position of the cap 57 on its threads. The cap, after adjustment, is locked in position by the lock nut 61.

The port 60 opens into an annular groove 62 surrounding the body of the compensator 48. This annular groove connects the bores 63 with the interior of the cap 46 and when the piston 53 is lifted by the pressure of the outlet of the pump, this pressure passes through the port 60 and the bores 63 into the cap 46 where it exerts pressure upon the piston 47. The piston 47 is adapted to overcome the pressure of the piston 43 and return the bearing 26 to its concentric position when the pressure in the discharge outlet of the pump achieves its maximum capacity.

To reduce the size of the spring 45 and to aid that spring in moving the bearing 26 into an eccentric position, a bore 64 connects the interior of the cap 41 and the cross port 65, connecting the outlets 40. Thus, the pressure in the outlet of the pump acts on the interior surface 66 of the piston 43. This is necessary as the pumping loads and centrifugal force set up during the operation of the pump tends to force the bearing 26 into the concentric position and the spring 45 would have to be of very large size to maintain the eccentricity. The sizes of the ends 66 and the head of the piston 47 are proportioned so that the pressure when exerted upon the piston 47 will readily overcome not only the spring 45 but the pressure on the end 66.

When the hydraulic system of my invention is to be used for a single pressure, a bore 67 connects with the interior of the cylinder 55 and a port 68 is normally opened, connecting the cylinder 55 back through a bleedoff passage 69 into the central cavity 3. When the piston 53 is raised to allow the pressure to position the bearing 26 to its concentric position, the port 68 is closed by the piston 53. When the pressure falls and the piston 53 closes the port 60, the fluid entrapped in the system is allowed to then bleed off through the port 68, back into the cavity 3 allowing the piston 47 to return to its normal position and the bearing 26 to the eccentric position.

When a dual pressure system is used, the bore 67 is not used and to bleed off the pressure in the cap 46 the piston 47 is made slightly smaller than the cylinder formed by the cap, thus permitting the fluid to bleed off past the piston into the cavity 3.

To regulate the dual system of pressure, a low pressure compensator 70 is used, which is of similar construction and has the same ports as the compensator 48. However, the port 71, which corresponds with the bore 51, is connected to a hydraulic line 72 which runs to a selector valve 73. This selector valve 73 either can connect the hydraulic line 72 with a hydraulic line 74 connected to the outlet 40 of the pump or can connect the line 74 with the hydraulic line 75 running to the high pressure operating valve 76.

The annular groove 62 of the low pressure compensator 70 connects through the bore 77 with the interior of cap 46. With the selector valve opening the line 74 to the line 72, the compensator 48 will not be active as in the preferred form of my invention this compensator only operates when the pressure in the system is from 2700 to 3000 lbs. per sq. in. while the low compensator 70 will operate on 1500 lbs. per sq. in. Thus, when the pressure in the outlet is at 1500 lbs. per sq. in., the piston 53 of the low pressure compensator 70 will lift and port the outlet fluid into the cap 46 and return the bearing 26 to its concentric position. When, however, the selector valve is opened to connect the lines 74 and 75, the low pressure compensator is cut out as no fluid pressure would enter line 72 or the bore 71. Therefore, the compensator 48 would be active and when the pressure reached 3000 lbs. the compensator 48 would act to return the bearing 26 to its concentric position.

In the schematic drawing, Figure 6, at 78 is designated the operating mechanism for the main landing gear, etc., which are operated on 3000 lbs. per sq. in. pressure. The valve 76 can be moved to three positions designated on the drawing as "operating," "closed" and "return." When in the "closed" position no pressure is admitted to the mechanism 78. When turned to the operating position the mechanism 78 is energized by the pressure passing through the line 74 to 75 and through the valve 76 to lower the landing gear, etc. When the valve is positioned in the return position the pressure in the lines actuates the mechanism 78 to lift the landing gear, etc. The valves 76 and 73 are connected by the lever 90 and push rod 91 so that whenever the valve 76 is turned to either the operating or the return position, the selector valve 73 is moved by the action of the cams 92 against the push rod 91 so as to connect the lines 74 and 75. When the valve 76 is in the closed position the spring 93 turns the selector valve 73 so as to connect the lines 72 and 74.

79 represents the return hydraulic lines which return the fluid to the supply tank 80, from which it passes through the hydraulic line 81 to the intake of the pump.

At 82 are indicated the various devices and their controls operating on the 1500 lbs. per sq. in. Each device has a separate operating valve and from all these devices a return line 83 connects with the main return 79. Safety valves in the form of low pressure relief valves 84 and high pressure relief valves 85 are inserted in the system.

To prevent the 3000 lbs. per sq. in. pressure developed by the pump when the selector valve 73 connects the lines 74 and 75 from entering the low pressure system 82, I use a pressure reducing regulator 86. This pressure reducing regulator 86 is shown in Figure 5 and comprises a body 87 having an inlet 88 connected to the line 74 by a line 89. This port 88 enters into the valve chamber 90, which has therein a port 91 closed by a piston valve 92 when it is lowered upon the seat 93. The port 91 opens into the port 94 which is connected to the line 95 connecting with the valves operating the various mechanisms 82.

Opening from the valve chamber 90 above the port 91 is a passage 96 connected with a compensator 97. This compensator has identical parts with the compensator 48 and the piston 53 is lifted by the pressure in the valve chamber 90 to open the port 60. This port 60 and the connecting annular groove 62 allows the pressure in the chamber 90 to pass into the chamber 98 where it exerts pressure upon the head 99 of the piston valve 92. When the piston 53 lifts to open the port 60 it allows the pressure to be exerted on the head 99. The piston valve 92 is forced closed upon its seat 93, closing the connection to the low pressure system. However, this valve 92 will flutter up and down as the pressure in the upper one-half of the chamber 90 varies responsive to the action of the compensator 97, thus allowing the reduced pressure only to arrive at the low pressure devices 82. To port off the hydraulic fluid entrapped in the chamber 98, the ports 68 and 67 are opened when the piston 53 closes the port 60 and the entrapped hydraulic fluid passes down the bore 100 to the outlets 101 where it flows to the return hydraulic line 79 by way of the pipe 102.

While I have described the preferred embodiments of my invention, I am not limited to any of the details herein set forth except as described in the following claims.

I claim:

1. In a pressure regulating system, a variable displacement pump having a driven shaft, a cylinder block rotatively carried on said driven shaft having a plurality of cylinders therein, pistons in said cylinders, a bearing surrounding said cylinder block upon which said pistons run, said bearing being movable from a concentric position to an eccentric position in relation to said shaft whereby the displacement of said cylinders is varied, plunger means normally adapted to force said bearing into maximum eccentricity, a return cylinder with a piston therein oppositely positioned from said plunger means and operable by hydraulic pressure therein to overcome said plunger means and to return said bearing to a concentric position, an outlet to said pump, a compensator cylinder having a spring loaded piston, a hydraulic connection between said outlet and said compensator cylinder, a port connecting said compensator cylinder and said return cylinder, said compensator piston operable when the pressure in said outlet achieves the desired maximum to open said port connecting said compensator cylinder with said return cylinder to actuate said return cylinder piston and to move said bearing toward its concentric position, and a relief port from said compensator cylinder adapted to open when said pressure falls below said maximum.

2. In a pressure regulating system, a variable displacement pump having a driven shaft, a cylinder block rotatively carried on said driven shaft having a plurality of cylinders therein, pistons in said cylinders, a bearing surrounding said cylinder block upon which said pistons run, said bearing being movable from a concentric position to an eccentric position in relation to said shaft whereby the displacement of said cylinders is varied, plunger means normally adapted to force said bearing into maximum eccentricity, a return cylinder with a piston therein oppositely positioned from said plunger means and operable by hydraulic pressure therein to overcome said plunger means and to return said bearing to a concentric position, an outlet to said pump, a compensator cylinder having a spring loaded piston, a hydraulic connection between said outlet and said compensator cylinder, a port connecting said compensator cylinder and said return cylinder, said compensator piston operable when the pressure in said outlet achieves the desired maximum to open said port connecting said compensator cylinder with said return cylinder to actuate said return cylinder piston and to move said bearing toward its concentric position, and a relief port from said compensator cylinder adapted to open when said pressure falls below said maximum, said piston in said compensator cylinder bein positioned so that said port and said relief port cannot both be opened at the same time.

3. In a pressure regulating system, a variable displacement pump having a driven shaft, a cylinder block rotatively carried on said driven shaft having a plurality of cylinders therein, pistons in said cylinders, a bearing surrounding said cylinder block upon which said pistons run, said bearing being movable from a concentric position to an eccentric position in relation to said shaft whereby the displacement of said cylinders is varied, an outlet to said pump, plunger means normally adapted to force said bearing into maximum eccentricity, said plunger means being spring actuated to start said pump, and a hydraulic connection between said outlet and said plunger means whereby the discharge pressure from said pump will be added to the spring pressure to hold said bearing in its eccentric position, a return cylinder with a piston therein oppositely positioned from said plunger means and operable by hydraulic pressure therein to overcome said plunger means and to return said bearing to a concentric position, an outlet to said pump, a compensator cylinder having a spring loaded piston, a hydraulic connection between said outlet and said compensator cylinder, a port connecting said compensator cylinder and said return cylinder, said compensator piston operable when the pressure in said outlet achieves the desired maximum to open said port connecting said compensator cylinder with said return cylinder to actuate said return cylinder piston and to move said bearing toward its concentric position, and a relief port from said compensator cylinder adapted to open when said pressure falls below said maximum.

4. In a pressure regulating system, a variable displacement pump having a driven shaft, a cylinder block rotatively carried on said driven shaft having a plurality of cylinders therein, pistons in said cylinders, a bearing surrounding said cylinder block upon which said pistons run, said bearing being movable from a concentric position to an eccentric position in relation to said shaft whereby the displacement of said cylinders is varied, plunger means normally adapted to force said bearing into maximum eccentricity, a return cylinder with a piston therein oppositely positioned from said plunger means and operable by hydraulic pressure therein to overcome said plunger means and to return said bearing to a concentric position, an outlet to said pump, a high pressure compensator cylinder having a spring loaded piston, a hydraulic connection between said outlet and said compensator cylinder, a port connecting said high pressure compensator cylinder and said return cylinder, said high pressure compensator piston operable when the pressure in said outlet achieves the desired maximum to open said port connecting said high pressure compensator cylinder with said return cylinder to actuate said return cylinder piston and to move said bearing toward its concentric position, a low pressure compensator cylinder having a spring loaded piston, a port connecting said low pressure compensator cylinder with said return cylinder, a hydraulic connection between said low pressure compensator cylinder and said pump outlet, a selector valve to open or close said last mentioned connection, said low pressure compensator piston operable by the pressure in said pump outlet when the said desired maximum low pressure is achieved to open said port connecting said return cylinder with said low pressure compensator.

5. In a pressure regulating system, a variable displacement pump having a driven shaft, a cylinder block rotatively carried on said driven shaft having a plurality of cylinders therein, pistons in said cylinders, a bearing surrounding said cylinder block upon which said pistons run, said bearing being movable from a concentric position to an eccentric position in relation to said shaft whereby the displacement of said cylinders is varied, plunger means normally adapted to force said bearing into maximum eccentricity, a return cylinder having therein a piston oppositely positioned from said plunger means and operable by hydraulic pressure thereon to overcome said plunger means and to move said bearing toward its concentric position, an outlet to said pump, a high pressure compensator having a piston, a hydraulic connection between said outlet and said compensator cylinder; a port from said high pressure compensator cylinder to said return cylinder outlet of said pump, said high pressure compensator piston operable when the pressure in said outlet achieves the desired maximum to open said port connecting said high pressure compensator cylinder with said return cylinder to actuate said return cylinder piston to move said bearing toward its concentric position, a low pressure compensator having a piston, a hydraulic connection between said outlet and said low pressure compensator, a port from said low pressure compensator to said return cylinder, said low pressure compensator piston operable by the pressure in said pump outlet when the said desired maximum low pressure is achieved to open said port connecting said low pressure compensator and said return cylinder, said return piston being slightly smaller than said return cylinder to permit bleed-off of the pressure exerted thereon when said compensator pistons close said ports connecting said return cylinder and said compensators.

6. In a pressure regulating system, a variable displacement pump having a driven shaft, a cylinder block rotatively carried on said driven shaft having a plurality of cylinders therein, pistons in said cylinder, a bearing surrounding said cylinder block upon which said pistons run, said bearing being movable from a concentric position to an eccentric position in relation to said shaft whereby the displacement of said cylinders is varied, plunger means normally adapted to force said bearing into maximum eccentricity, a return cylinder with a piston therein oppositely positioned from said plunger means and operable by hydraulic pressure therein to overcome said plunger means to move said bearing toward its concentric position, an outlet to said pump, a high pressure compensator cylinder having a piston, a hydraulic connection between said outlet and said compensator cylinder, a port connecting said high pressure compensator cylinder and said return cylinder, said high pressure compensator piston operable when the pressure in said outlet achieves the desired maximum to open said port connecting said high pressure compensator cylinder with said return cylinder to actuate said return cylinder piston and to move said bearing toward its concentric position, a low pressure compensator cylinder having a piston, a hydraulic connection between said outlet and said low pressure compensator cylinder, a port connecting said low pressure compensator cylinder with said return cylinder, said low pressure compensator piston operable to open said port to actuate said return cylinder piston and to move said bearing towards its concentric position, a selector valve, a pressure reducing valve, high pressure mechanisms and a valve to operate the same, low pressure mechanisms and valves to operate the same, a hydraulic connection between said low pressure compensator cylinder and said selector valve, a hydraulic connection between said pump outlet, said pressure reducing valve and said selector valve, and a hydraulic connection between said selector valve and the valve operating said high pressure mechanisms, said selector valve selectively adapted to hydraulically connect said outlet to said low pressure compensator or to hydraulically connect said outlet to said valve operating said high pressure mechanisms, and a hydraulic connection between said pressure reducing valves and said valves operating said low pressure mechanisms.

7. In a pressure regulating system, a variable displacement pump having a driven shaft, a cylinder block rotatively carried on said driven shaft having a plurality of cylinders therein, pistons in said cylinders, a bearing surrounding said cylinder block upon which said pistons run, said bearing being movable from a concentric position to an eccentric position in relation to said shaft whereby the displacement of said cylinders is varied, plunger means normally adapted to force said bearing into maximum eccentricity, a return cylinder with a piston therein oppositely positioned from said plunger means and operable by hydraulic pressure therein to overcome said spring means and to move said bearing towards its concentric position, an outlet to said pump, a high pressure compensator cylinder having a piston, a hydraulic connection between said outlet and said compensator cylinder, a port connecting said high pressure compensator cylinder and said return cylinder, said high pressure compensator piston operable when the pressure in said outlet achieves the desired maximum to open said port connecting said high pressure compensator cylinder with said return cylinder to actuate said return cylinder, a low pressure compensator cylinder having a piston, a hydraulic connection between said outlet and said compensator cylinder, a port connecting said low pressure compensator cylinder with said return cylinder, a selector valve, a pressure reducing valve, high pressure mechanisms and a valve to operate the same, low pressure mechanisms and valves to operate the same, a hydraulic connection between said low pressure compensator cylinder and said selector valve, a hydraulic connection between said pump outlet and said pressure reducing valve and said selector valve, and a hydraulic connection between said selector valve and the valve operating said high pressure mechanisms, said selector valve selectively adapted to hydraulically connect said outlet to said low pressure compensator or to hydraulically connect said outlet to said valve operating said high pressure mechanisms, and a hydraulic connection between said pressure reducing mechanisms and said valves operating said low pressure mechanisms, said return pistons being slightly smaller than said return cylinder to permit bleed-off of the pressure exerted thereon when said compensator pistons close said ports connecting said return cylinder and said compensators.

8. In a pressure regulating system, a variable displacement pump having a driven shaft, a cylinder block rotatively carried on said driven shaft having a plurality of cylinders therein, pistons in said cylinders, a bearing surrounding said cylinder block upon which said pistons run, said bearing being movable from a concentric position to an eccentric position in relation to said shaft whereby the displacement of said cylinders is varied, plunger means normally adapted to force said bearing into maximum eccentricity, a return cylinder with a piston therein oppositely positioned from said plunger means and operable by hydraulic pressure therein to overcome said spring means and to return said bearing to a concentric position, an outlet to said pump, a high pressure compensator cylinder having a piston, a hydraulic connection between said outlet and said compensator cylinder, a port connecting said high pressure compensator cylinder and said return cylinder, said high pressure compensator piston operable when the pressure in said outlet achieves the desired maximum to open said port connecting said high pressure compensator cylinder with said return cylinder to actuate said return cylinder piston and to move said bearing toward its concentric position, a low pressure compensator cylinder having a piston, a hydraulic connection between said outlet and said low pressure compensator cylinder, a port connecting said low pressure compensator cylinder with said return cylinder, a selector valve, a pressure reducing valve, high pressure mechanisms and a valve to operate the same, low pressure mechanisms and valves to operate the same, a hydraulic connection between said low pressure compensator cylinder and said selector valve, a hydraulic connection between said pump outlet and said pressure reducing valve and said selector valve, and a hydraulic connection between said selector valve and the valve operating said high pressure mechanisms, said selector valve selectively adapted to hydraulically connect said outlet and said low pressure compensator, or to hydraulically connect said outlet to said valve operating said high pressure mechanisms, a hydraulic connection between said pressure reducing mechanisms and said valves operating said low pressure mechanisms, an operating handle connected to said selector valve and to said valve operating said high pressure mechanisms to simultaneously open said operating valve and to connect the outlet of said pump to said valve and to close said valve and connect said outlet with said low pressure compensator cylinder.

9. In a pressure regulating system, a variable displacement pump having a discharge port, means for varying the displacement of said pump, a high pressure compensator connected to said discharge and adapted to actuate said means for varying said displacement when the discharge pressure exceeds the desired maximum, said compensator being adjustable to vary said desired maximum pressure, a low pressure compensator connected to said discharge and adapted to actuate said means for varying said displacement when the discharge pressure exceeds the desired maximum low pressure, said low pressure compensator being adjustable to vary said maximum low pressure, and a valve between said low pressure compensator and said discharge to shut off said connection between said low pressure compensator and said discharge.

10. In a pressure regulating system, a variable displacement pump having a discharge port, means for varying the displacement of said pump, a high pressure compensator connected to said discharge and adapted to actuate said means for varying said displacement when the discharge pressure exceeds the desired maximum, a low pressure compensator connected to said discharge and adapted to actuate said means for varying said displacement when the discharge pressure exceeds the desired maximum low pressure, and a valve between said low pressure compensator and said discharge to shut off said connection between said low pressure compensator and said discharge.

CLARENCE S. SORENSEN.

REFERENCES CITED

The following references are of record in the file of this patent:

UNITED STATES PATENTS

| Number | Name | Date |
|---|---|---|
| 1,870,501 | Ernst | Aug. 9, 1932 |
| 2,230,054 | Ernst | Jan. 28, 1941 |
| 2,418,532 | Waldie | Apr. 8, 1947 |